Nov. 16, 1954     C. F. QUIROLO     2,694,343

DEBURRING TOOL

Filed Dec. 24, 1951

*INVENTOR.*
CHARLES F. QUIROLO

BY

ATTORNEY

UNITED STATES PATENT OFFICE

2,694,343
DEBURRING TOOL

Charles F. Quirolo, Los Angeles, Calif., assignor to North American Aviation, Inc.

Application December 24, 1951, Serial No. 263,094

6 Claims. (Cl. 90—24)

When holes are drilled in metal parts a burr is normally left projecting upwardly around the drilled hole. It becomes necessary to remove this burr so that parts can properly mate together. When the drilling operation is on formed parts, such as parts having a flange thereon, there has been no tool or machine for automatically removing the burrs from these parts. Heretofore the only suitable method of removing burrs has been by laborious time-consuming hand work.

Therefore, it is an object of this invention to automatically remove burrs from material.

Another object of this invention is to provide a tool for removing burrs from formed parts.

An additional object of this invention is to provide a tool for removing burrs that is fast, automatic and economical in its operation, eliminating hand work.

Figure 1:
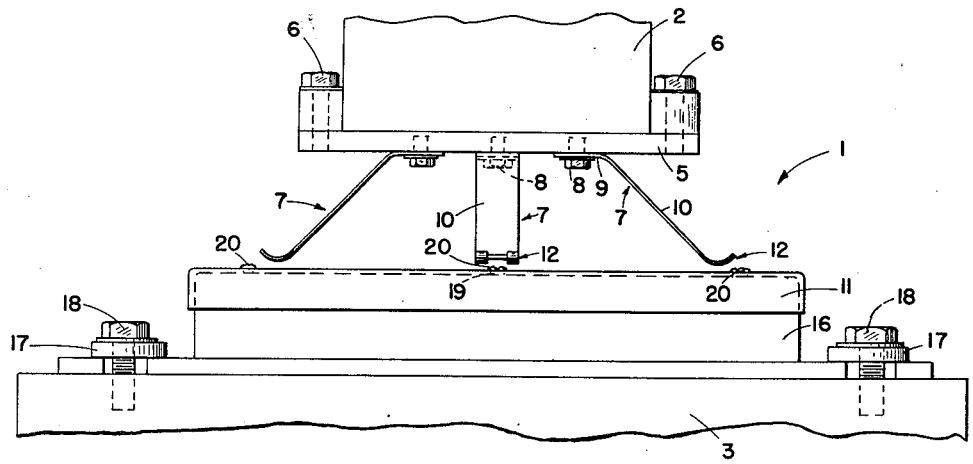
Figure 3:
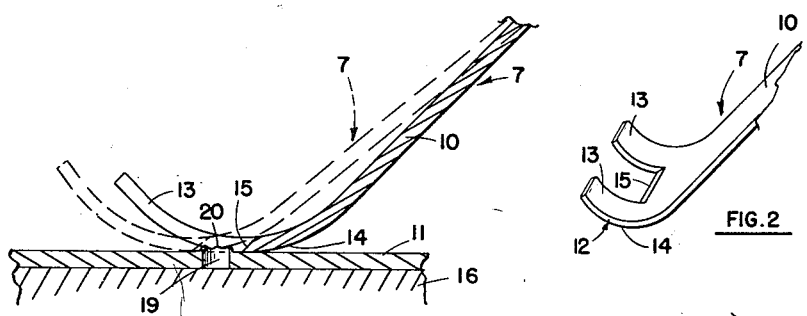
Figure 4:
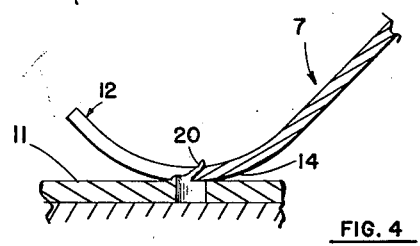
Figure 5:
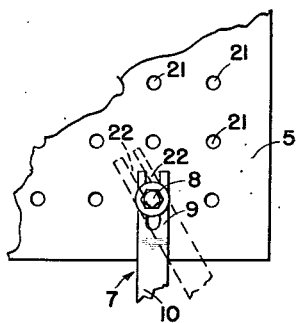
Figure 6:
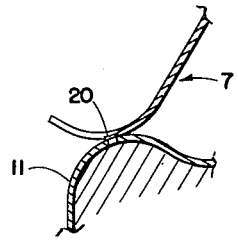

These and other objects of this invention will become apparent from the following description taken in connection with the accompanying drawings, in which Fig. 1 is a side elevation of the deburring tool comprising this invention, Fig. 2 is a fragmentary perspective view of a cutting blade, Fig. 3 is a side elevation, partly in section, of a cutting blade contacting a work-piece, Fig. 4 is a side elevation, partly in section, of a blade during removal of a burr, Fig. 5 is a bottom elevation of the supporting base showing adjustability of the blades, and Fig. 6 is a side elevation, partly in section, of a blade contacting a curved work-piece.

The deburring tool 1 of this invention requires a moveable platen element 2 and a stationary bed 3. Platen 2 may be operated in any suitable manner such as by a hydraulic cylinder (not shown). A supporting base member 5 is secured to and carried by platen 2 in a suitable manner such as by bolts 6. Depending downwardly from base member 5 are a plurality of blades 7 which may be held to base 5 by means of screws 8 passing through openings in attaching portion 9 of the blades. The blades are in this manner carried with shank portion 10 at an angle other than 90° with respect to the upper surface of a work-piece 11 and are preferably at approximately the angle shown which is in the neighborhood of 45°. Blades 7 should be of resilient material.

Outer end 12 of each blade 7 includes turned up tip portions 13 which should include a curved surface at 14, the lowermost portion of the blade. At the base of tips 13 and opposite the location of the curved surfaces 14 of outer end 12, is a sharpened cutting edge 15. This construction may best be seen by reference to Fig. 2.

Work-piece 11 is suitably positioned beneath platen 2 and the blades. For example, the work-piece may rest on a supporting block 16 which in turn is carried by stationary bed 3. The supporting block may be held in place by means of clamps 17 attached to the stationary bed by means of screws 18. Work-piece 11 includes a plurality of previously drilled holes 19 which have left a burr 20 projecting upwardly from the work-piece around each hole. In operation of the deburring tool, platen 2 is lowered thereby bringing outer end 12 of each blade into contact with the work-piece. The blades and the work-piece should be so positioned relative to each other than when the blades first contact the work-piece cutting edge 15 of each blade is at a location just inside the edge of a hole 19, with tip portions 13 straddling the hole, and with curved surfaces 14 in engagement with the work-piece. As platen 2 continues in its downward movement blades are deflected outwardly (to the position shown in phantom in Fig. 3) thereby sliding the blades along the surface of the work-piece, with curved surfaces 14 acting as bearing surfaces for the blades. As this action takes place cutting edges 15 cut off burrs 20 as illustrated in Fig. 4, and leave the surface of the work-piece free of upward projections. It can be seen that this deburring tool in one operation can remove the burrs from almost any number of holes. In addition the work-piece is mounted in a very simple manner in the tool requiring no special clamps or complicated holding fixtures.

In carrying out the deburring operation with this tool, blades 7 should be arranged so that cutting edge 15 is in the neighborhood of one sixteenth of an inch from the edge of the hole when initial contact is made with the work-piece. Such a location will assure removal of all of the burr with an even cut and with no gouging. It is preferable also to arrange the blades so that they will simultaneously make their initial contact with the work-piece. Otherwise, unless supporting base 5 is very heavy, a deflection of the supporting base will take place after the first blades have contacted the work-piece, which may cause gouging by the cutting edge when the other blades have come in contact with the work-piece.

If desired, the tool may be constructed so that blades 7 are adjustable relative to support base 5 which will allow the tool to be used in deburring various sizes and types of work-pieces. One manner of accomplishing this feature of adjustability is shown in Fig. 5. Here a plurality of tapped holes 21 are provided for receiving screws 8 in mounting the blades. The attaching portion 9 of each blade is provided with an elongated slot 22 which may receive a screw 8. The proper hole 21 may be selected for each blade so that cutting edge 14 will be in approximate alignment with a burr to be removed. Further positioning of the blade may be obtained by means of slot 22, and the blade may be swiveled for additional adjustment to a location such as shown in phantom in Fig. 5.

It should be obvious from the foregoing description that the tool is equally applicable for cutting projections of a nature other than burrs from a work-piece. As many blades as desired may be used and the work-piece need not present a surface parallel to supporting base 5 in order for satisfactory cutting action by the blades. The latter arrangement is illustrated in Fig. 6 and it should be noted that for such arrangements shank portion 10 again makes an angle other than 90° with the surface of the work-piece so that portions 14 and 15 of the blade may function properly.

It is not necessary for blades 7 to extend outwardly from a central position, as shown in Fig. 1. In some instances the contour of the work-piece may make it desirable to pivot the blades so that some or all of the blades extend inwardly or are at some other position. The angle of shank 10 relative to the work-piece must, of course, be other than 90° for all locations of blades 7.

Although this invention has been described in detail, it should be clearly understood that the same is by way of illustration only and not to be taken by way of limitation, the spirit and scope of this invention being limited only by the appended claims.

I claim:

1. A deburring tool comprising a movable platen; a work supporting member adapted to support a work-piece thereon; and a plurality of blade members depending downwardly and outwardly from said platen, the outer end of each of said blade members including a cutting edge and a bearing surface, whereby upon vertical movement of said platen relative to said work supporting member said bearing surfaces engage such a work-piece and slide outwardly thereon and said cutting edges remove upwardly projecting portions from said work-piece.

2. A device as recited in claim 1 including in addition means for adjusting said blade members relative to said platen for alignment with said upwardly projecting portions, and in which said blade members are arranged to simultaneously contact said work-piece.

3. A deburring tool comprising a work supporting member adapted to support a work-piece thereon; a platen; said platen being movable relative to said work supporting member; and a plurality of elongated resilient blade members depending from said platen at an angle other than 90° relative to said work-piece, each of said blade members including a rounded end portion adapted to engage such a work-piece and slide thereon upon movement of said platen toward said work supporting member, each of said end portions being provided with a recessed sharpened edge for removing projections from said work-piece.

4. A deburring tool comprising a platen; a work supporting member adapted to support a work-piece thereon; said platen being movable relative to said work supporting member; and a plurality of blade members secured to and carried by said platen whereby said blade members depend downwardly and outwardly therefrom, each of said blade members including an elongated resilient portion and a rounded bifurcated end portion, said end portion including a sharpened cutting edge recessed therein, said blade members being so arranged that upon movement of said platen toward said work supporting member said end portions simultaneously contact such a work-piece and slide outwardly thereon thereby deflecting said elongated resilient portion and causing said cutting edge to remove burrs projecting from said work-piece.

5. A deburring tool comprising a platen; a work supporting member below said platen adapted to support a work-piece thereon, the upper surface of such a work-piece including a plurality of burrs projecting therefrom; a plurality of elongated resilient blades; and means for adjustably securing said blades to said platen whereby said blades depend downwardly at an angle other than 90° relative to said upper surface of a work-piece on said work supporting member and at positions corresponding to the location of burrs on said work-piece, each of said blades terminating in a bifurcated end portion defined by two upturned tip portions and a cutting edge disposed therebetween at the base thereof; said platen being movable downwardly, thereby bringing said end portions into engagement with said surface and deflecting said blades whereby said base portions slide laterally thereon and said cutting edges remove said burrs therefrom.

6. A deburring tool comprising a platen; a work supporting member adapted to support a workpiece thereon; and a plurality of cutting members depending downwardly and angularly from said platen, said platen being vertically movable relative to said supporting member, each of said cutting members including a bearing portion and a cutting portion, said bearing portion being brought into engagement with such a workpiece by vertical movement of said platen, and said cutting members being thereupon shifted laterally along such a workpiece whereby said cutting portions remove upwardly projecting portions from said workpiece.

References Cited in the file of this patent

UNITED STATES PATENTS

| Number | Name | Date |
|--------|------|------|
| 181,279 | Perkins | Aug. 22, 1876 |
| 2,015,955 | Morton | Oct. 1, 1935 |

FOREIGN PATENTS

| Number | Country | Date |
|--------|---------|------|
| 302,341 | Germany | Dec. 15, 1917 |